No. 663,609. Patented Dec. 11, 1900.
G. L. MARTIN.
DYNAMO OR MOTOR.
(Application filed Aug. 24, 1900.)
(No Model.)

WITNESSES:
O. N. Raymond
Harry S. Marsh

INVENTOR
George L. Martin
BY
Garry P. Van Wye
ATTORNEY

UNITED STATES PATENT OFFICE.

GEORGE L. MARTIN, OF NEW YORK, N. Y.

DYNAMO OR MOTOR.

SPECIFICATION forming part of Letters Patent No. 663,609, dated December 11, 1900.

Application filed August 24, 1900. Serial No. 27,938. (No model.)

*To all whom it may concern:*

Be it known that I, GEORGE L. MARTIN, a citizen of the United States, residing at New York, in the county and State of New York, have invented a new and useful Dynamo or Motor, of which the following is a specification.

My invention relates to dynamos or motors, and has for one object to provide a dynamo or motor casing of the inclosed type which will be easy to manufacture, possess high efficiency, and be easily adjusted to different positions, a further object being to produce a dynamo especially adapted to generate electricity to fire the charges in explosive-engines, especially in engines mounted on vehicles where it is necessary that a spark should be produced by the dynamo at the earliest possible moment after starting and that sufficient electricity should be generated to operate the sparking device even when the vehicle is moving at a very slow speed, as in climbing hills. I attain these objects by the mechanism illustrated in the accompanying drawings, in which—

Figure 1:
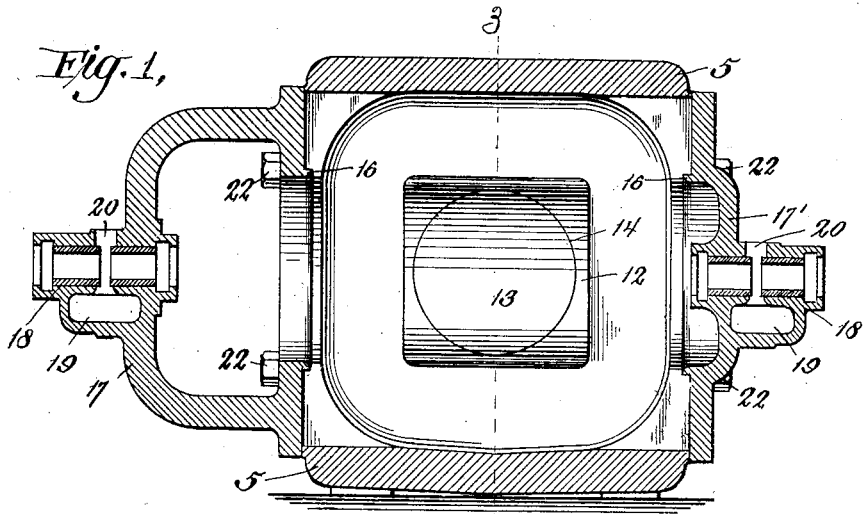
Figure 2:
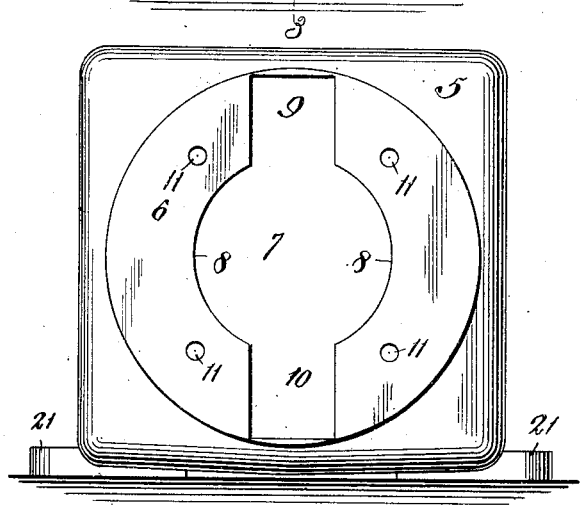
Figure 3:
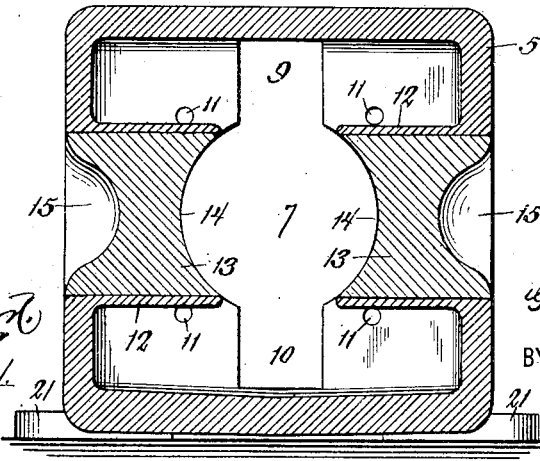

Figure 1 is a central vertical section of a dynamo-casing constructed according to my invention. Fig. 2 is an end view thereof with the heads removed, and Fig. 3 is a transverse section on the line 3 3 of Fig. 1.

In the accompanying drawings like numerals of reference refer to the same parts in each of the views, and in the practice of my invention I provide a casing 5, which is preferably cast from steel and has rounded corners and edges, as clearly shown. The ends of the casing 5 are faced, as shown at 6 in Fig. 2, and in each end is formed an aperture 7, which resembles a double-bitted keyhole and consists of a circular part 8 and rectangular parts 9 and 10. In the faced end I form a plurality of bolt-holes 11, preferably four in number, all of which are concentric with the circular part 8 of the aperture 7 and are equidistant apart, for reasons hereinafter explained. The casing is provided centrally of each side with a pole of the following construction: In casting the casing I may cast the poles integral therewith and then bore out the central part of each pole, leaving a hollow pole or boss 12, and I then take a solid piece of steel 13 and drive it into the aperture thus formed so as to make a very tight connection. The pole is then finished up, so as to form the concave face 14, which is concentric with the circular part 8 of the aperture 7 and having the same radius. The outer end of the core 13 is concaved concentrically, as shown at 15, so that the flow of electricity through the casing 5 will be directed inward into the poles, the depressions 15 being preferably deeper than the thickness of the casing.

Instead of casting the poles solid it will of course be understood that they might be cast hollow, but should be bored out so that the connection between the core 13 and the shell will be a very close one. It is also evident that for certain classes of work the core 13 would not be needed, and in that case the poles could be cast solid with the casing 5, and all that would be necessary would be to face off the concave face 14, as the cavity 15 could be formed in the outer shell of the casing in casting, as will be readily understood.

In Fig. 1 I have shown the heads in position. These may be of any desired shape or form, with the exception that each is provided with an inwardly-directed flange 16, which is adapted to engage the walls of the circular part 8 of the aperture 7, and thereby center the bearings 18, as will be readily understood. As each bearing 18 is provided with an oil-cup 19, it is necessary that the mouth 20 of the oil-cup 19 should always be directed upward, and as by reason of the fact that the casing may be secured to the floor by means of the lugs 21 or to the wall or ceiling, as may be desired, or mounted in any position on the vehicle it is necessary that the heads should be so mounted that they may be turned to meet the requirements of the oil-cups. For this reason the bolt-holes 11 are made equidistant apart and concentric with the circular part of the aperture 7, and the heads 17 and 17' are mounted upon the respective ends of the casing by bolts 22, which may be removed, and if there are four bolt-holes the heads may be given a quarter-turn or a half-turn, as may be desired, which movement may be increased or dimished accordingly as there are a greater or less number of bolt-holes 11, as will be readily understood.

My reason for making the poles of the composite character shown and described is on account of the texture of the steel. By using the cores 13 I can get a more suitable steel for retaining the magnetism than is possible to obtain in casting even from steel, so that a current will be generated with fewer turns of the armature. (Not shown, but which may be of any suitable form.) This is a very important feature in dynamos designed to be used in connection with sparking devices on vehicle-motors, for the reason that the engine will not run until a spark is generated to fire the explosive charge, and the dynamo must run at considerable speed before a sufficient current is generated to continue to fire the charges, so that with dynamos heretofore used for this purpose a battery had to be carried in addition to the dynamo, so that in starting the engine the battery could be used, and when started the sparking device was switched off onto the dynamo-current, while in climbing hills it is frequently necessary to switch back to the battery on account of the slow speed of the dynamo. With my invention it will not be necessary to carry a battery, as a sufficient current will be generated by the dynamo to create the spark to explode the charge as soon as the shaft of the engine has been rotated a sufficient number of times to generate the proper charge, and it will not require high speed to generate sufficient current to operate the sparking device, so that a battery will not be needed in climbing the steep grades.

In motors and dynamos of large size it will not be necessary to insert the core 13; but the poles should be cast integral with the casing 5. However, the cavities 15 should be retained; but in that case the cavities would be formed in the outer wall of the casing. The construction is otherwise just the same, and the cavities 15 would serve to direct the flow of electricity in the casing into the poles just the same as if the cores 13 were used.

It is evident of course that the cores 13 need not be cylindrical in form, as shown, but may be square or any other shape in cross-section, that the flanges 16 need not be continuous, and that the rectangular parts 9 and 10 of the aperture 7 may be omitted in large dynamos and motors, as they are only for convenience in inserting the fields, and many other changes may be made without departing from the spirit of my invention.

Having thus described my invention, what I claim as new, and desire to secure by Letters Patent, is—

1. In a dynamo or motor, a casing provided with poles, comprising a shell integral with said casing and an inserted core extending through said shell and forming part of the face of the pole, as and for the purpose set forth.

2. In a dynamo or motor, a rectangular casing having rounded corners and edges, and provided with poles, said poles comprising a shell integral with said casing and an inserted steel core extending through said shell, and forming part of the face of the pole, as and for the purpose set forth.

3. In a dynamo or motor, a rectangular casing having rounded corners and edges, and provided with poles, said poles comprising a shell integral with said casing and a steel core extending through said shell and forming part of the face of the pole, said core being provided with a cavity or recess in the rear end thereof, as and for the purpose set forth.

4. In a dynamo or motor, a casing having a circular opening in the end thereof, and having a plurality of bolt-holes concentric with said opening, and equidistant apart, and a head having a flange adapted to engage the walls of said opening, and provided with bolt-holes which register with the said bolt-holes in the casing, as and for the purpose set forth.

In testimony whereof I have signed my name to this specification in the presence of two subscribing witnesses.

GEORGE L. MARTIN.

Witnesses:
S. L. BARTLETT,
ROBERT F. WARK,